US008454351B2

(12) United States Patent
Tsiava et al.

(10) Patent No.: US 8,454,351 B2
(45) Date of Patent: Jun. 4, 2013

(54) STAGED COMBUSTION METHOD USING A PREHEATED OXIDANT

(75) Inventors: Remi Pierre Tsiava, St Germain les Corbeil (FR); Bertrand Leroux, Issy les Moulineaux (FR); Christian Imbernon, Thiais (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/582,255

(22) PCT Filed: Dec. 6, 2004

(86) PCT No.: PCT/FR2004/050650
§ 371 (c)(1),
(2), (4) Date: Mar. 23, 2007

(87) PCT Pub. No.: WO2005/059439
PCT Pub. Date: Jun. 30, 2005

(65) Prior Publication Data
US 2007/0287107 A1 Dec. 13, 2007

(30) Foreign Application Priority Data
Dec. 16, 2003 (FR) .................................... 03 51061

(51) Int. Cl.
*F23M 3/04* (2006.01)
(52) U.S. Cl.
USPC ..................................... 431/10; 431/2; 431/8
(58) Field of Classification Search
USPC ............... 431/8, 2, 10, 11, 12, 207, 351, 352
See application file for complete search history.

(56) References Cited

U.S. PATENT DOCUMENTS

| 5,807,418 | A | | 9/1998 | Chamberland et al. |
|---|---|---|---|---|
| 5,975,886 | A | * | 11/1999 | Philippe ......................... 431/165 |
| 6,071,116 | A | | 6/2000 | Philippe et al. |
| 6,196,831 | B1 | | 3/2001 | Labegorre et al. |
| 6,331,107 | B1 | * | 12/2001 | Philippe ......................... 431/285 |
| 6,783,357 | B2 | * | 8/2004 | Joshi et al. ..................... 431/161 |
| 6,910,879 | B2 | * | 6/2005 | Dugue et al. ...................... 431/8 |
| 6,913,457 | B2 | * | 7/2005 | Penfornis et al. .................. 431/8 |
| 2003/0054301 | A1 | * | 3/2003 | Borders et al. .................... 431/8 |
| 2003/0054303 | A1 | * | 3/2003 | Rabovitser et al. ............... 431/9 |
| 2003/0157450 | A1 | | 8/2003 | Fossen et al. |

FOREIGN PATENT DOCUMENTS

| EP | 0 754 912 | 1/1997 |
|---|---|---|
| EP | 0 762 050 | 3/1997 |
| FR | 2 823 290 | 10/2002 |
| JP | 57-104006 | 6/1982 |
| WO | WO 97/32162 | 9/1997 |

OTHER PUBLICATIONS

International Search Report for PCT/FR2004/050650.

* cited by examiner

*Primary Examiner* — Thomas Denion
*Assistant Examiner* — Daniel Bernstein
(74) *Attorney, Agent, or Firm* — Christopher J. Cronin; Justin K. Murray

(57) ABSTRACT

The invention relates to a method for the combustion of a fuel and an oxidant, in which at least one jet of fuel and at least two jets of oxidant are injected. According to the invention, at least one first oxidant is injected at a distance l1, at most 20 cm, from the fuel injection point and at least one second oxidant is injected at a distance l2 from the fuel injection point, l2 being greater than l1. The aforementioned oxidants are injected in quantities such that the sum of the quantities thereof is at least equal to the stoichiometric quantity of oxidant necessary in order to ensure the combustion of the injected fuel. Moreover, the first oxidant is oxygen-enriched air having a temperature of at most 200 DEG C. and the second oxidant is air preheated to a temperature of at least 300 DEG C.

7 Claims, No Drawings

STAGED COMBUSTION METHOD USING A PREHEATED OXIDANT

The present invention relates to a staged combustion method using a preheated oxidant.

In present combustion methods, it is common to recover the energy liberated by the furnaces in order to reduce fuel consumption. The heat convected by the furnace flue gases can be recovered by using waste heat boilers or regenerators. This energy recovery is particularly common for combustion methods in which the oxidant is air.

For combustions in which the oxidant is oxygen, it is also advisable to recover the energy. However, techniques valid for air are not directly applicable to oxygen. In fact, the flue gases produced by combustion with oxygen have high moisture contents and may contain a significant quantity of corrosive particles. Two technologies are currently available for preheating the oxygen:

U.S. Pat. No. 5,807,418 describes a direct heat exchange with the combustion products and the oxidant comprising at least 50% oxygen, according to U.S. Pat. No. 6,071,116, an intermediate fluid and a first heat exchanger are used to recover the energy from the burnt gases before restoring this energy to the oxygen via a second heat exchanger.

These technologies may raise certain technical problems such as heat exchanger maintenance and service life problems, essentially due to corrosion, the lack of means for measuring and controlling the hot oxygen (no control means compatible with hot oxygen) and the safety problems associated with the use of this hot oxygen.

The problem posed by the present invention is to propose a novel combustion method using oxygen as oxidant and suitable for recovering the energy from the flue gases.

Another problem posed by the present invention is to propose a novel combustion method using oxygen as oxidant and suitable for recovering the energy from the flue gases without encountering the problems raised by oxygen preheating.

For these purposes, the invention relates to a fuel combustion method in which at least one fuel and at least two oxidants are injected:

the first oxidant being injected at a distance $I_1$, of at most 20 cm, and preferably of at most 15 cm, from the fuel injection point, the second oxidant being injected at a distance $I_2$ from the fuel injection point, $I_2$ being greater than $I_1$, the oxidants being injected in molar quantities such that the sum of their molar quantities is at least equal to the molar stoichiometric quantity of oxidant necessary to ensure the combustion of the injected fuel, in which the first oxidant is oxygen-enriched air having a temperature of at most 200° C. and in which the second oxidant is air preheated to a temperature of at least 300° C.

According to the invention, the combustion method is a staged combustion method. This type of combustion consists in introducing the oxidant necessary for combustion of the fuel in the form of at least two separate jets injected at different distances ($I_1$ and $I_2$) from the fuel introduction point in the furnace. The first oxidant is injected in a quantity such that it causes incomplete combustion of the fuel and the gases produced by this combustion between the fuel and the first oxidant still comprise at least part of the fuel. The second oxidant is injected in a quantity such that it completes the combustion of the fuel still present in the gases produced by the combustion between the fuel and the first oxidant. According to the invention, the oxidants are injected in quantities such that the sum of their quantities is at least equal to the stoichiometric quantity of oxidant necessary to ensure the combustion of the injected fuel. Stoichiometric quantity means the quantity of molecules of oxygen necessary to obtain the complete combustion of the injected fuel. The various oxidants must supply at least all the oxygen necessary for this total combustion of the fuel.

According to an essential feature of the invention, the first oxidant injected at a distance $I_1$ consists of oxygen-enriched air having a temperature of at most 200° C. "Oxygen-enriched air" means air enriched with oxygen so that the oxygen concentration in the enriched air is at least 30%, and preferably at least 50%. The oxygen-enriched air is preferably obtained by mixing ambient air with a cryogenic oxygen source. The oxidant injected at the distance $I_1$ has a temperature of at most 200° C., which means that this oxidant is not preheated, particularly by the energy regenerators from the furnace in which the combustion is implemented. According to another essential feature of the invention, the second oxidant injected at the distance $I_2$ consists of air preheated to a temperature of at least 300° C. The preheating can be carried out by any heat recovery technique using the hot combustion products from the furnace. Thus, the preheated air may be heated by heat exchange with part of the hot combustion products according to any known technique of the prior art.

According to a variant of the method of the invention, at least two oxidants are injected at a distance $I_1$ of at most 15 cm, one, called primary, being injected in a mixture with the fuel or close to the fuel, and the other, called secondary, being injected at a distance from the fuel. "In a mixture" means that the primary oxidant and the fuel are premixed before being introduced in the combustion zone. This premixing can be carried out by injecting the primary oxidant and the fuel into a cavity, said cavity terminating in the combustion zone. "Close to" means that the primary oxidant is the oxidant introduced at the point closest to the fuel introduction point among all the oxidants injected during the combustion method. The secondary oxidant is introduced at a distance from the fuel, that is at a distance $I_{1\,secondary}$ from the upper fuel introduction point at the distance $I_{1\,primary}$ defined between the primary oxidant and fuel introduction points. The primary oxidant and the secondary oxidant may have different oxygen concentrations; preferably, the primary oxidant has a higher oxygen concentration than the secondary oxidant. The quantity of oxidant injected by the primary oxidant jet preferably represents 2 to 50% of the stoichiometric quantity of oxygen necessary to ensure the combustion of the injected fuel. The quantity of oxidant injected by the secondary oxidant jet and the oxidant jet injected at the distance $I_2$ may represent 50 to 98% of the stoichiometric quantity of oxygen necessary to ensure the combustion of the injected fuel. In this variant, the secondary oxidant may be divided into a plurality of secondary oxidant jets, which may be injected either all at the same distance $I_{1\,secondary}$ from the fuel jet, or at different distances $I_{1\,secondary}$ from the fuel jet, these distances remaining shorter than 20 cm, preferably shorter than 15 cm.

According to a particular embodiment of the invention, the oxidant injected at the distance $I_2$ may be divided into a plurality of oxidant jets.

The method according to the present invention may be applied to any type of combustion furnace and particularly to heating furnaces, glass-melting furnaces, and melting furnaces for ferrous or nonferrous metals.

By the implementation of the method as previously described, it has been observed that, although the method uses air containing nitrogen, the NOx emissions remain low and compatible with environmental release standards. In any case, they remain lower than the contents obtained for the same burner exclusively using preheated oxygen. The method according to the invention hence has neither the drawbacks of preheated oxygen, nor those of combustion with air. Furthermore, the use of enriched air limits refractory wear.

The invention claimed is:

1. A fuel combustion method in which at least one fuel and at least two oxidants are injected:
   a) at least one first oxidant being injected at a distance $I_1$ of at most 20 cm from the fuel injection point,
   b) at least one second oxidant being injected at a distance $I_2$ from the fuel injection point, $I_2$ being greater than $I_1$, the oxidants being injected in quantities such that the sum of their quantities is at least equal to the stoichiometric quantity of oxidant necessary to ensure the combustion of the injected fuel, wherein the first oxidant is oxygen-enriched air having a temperature of at most 200° C. and in that the second oxidant is air preheated to a temperature of at least 300° C., wherein the first oxidant is not preheated, wherein at least two first oxidants are injected at a distance $I_1$ of at most 20 cm, one, called primary, being injected in a mixture with the fuel and the other, called secondary, being injected at a distance from the fuel.

2. The method of claim 1, wherein the oxygen concentration in the oxygen-enriched air is at least 30%.

3. The method of claim 1, wherein the oxygen-enriched air is obtained by mixing ambient air with a cryogenic oxygen source.

4. The method of claim 1, wherein the preheated air is heated by heat exchange with part of the hot combustion products.

5. The method claim 1, wherein the quantity of oxidant injected by the primary oxidant jet represents 2 to 50% of the stoichiometric quantity of oxygen necessary to ensure the combustion of the injected fuel.

6. The method of claim 1, wherein the secondary oxidant is divided into a plurality of secondary oxidant jets.

7. The method of claim 1, wherein the second oxidant injected at the distance $I_2$ is divided into a plurality of oxidant jets.

* * * * *